United States Patent
Przybilla

(10) Patent No.: US 7,925,892 B2
(45) Date of Patent: Apr. 12, 2011

(54) METHOD TO GRANT MODIFICATION RIGHTS FOR A SMART CARD

(75) Inventor: Henrik Przybilla, Hamburg (DE)

(73) Assignee: NXP B.V., Eindhoven (NL)

( * ) Notice: Subject to any disclaimer, the term of this patent is extended or adjusted under 35 U.S.C. 154(b) by 1594 days.

(21) Appl. No.: 10/550,874

(22) PCT Filed: Mar. 30, 2004

(86) PCT No.: PCT/IB2004/050358
§ 371 (c)(1),
(2), (4) Date: Sep. 27, 2005

(87) PCT Pub. No.: WO2004/088603
PCT Pub. Date: Oct. 14, 2004

(65) Prior Publication Data
US 2006/0280299 A1   Dec. 14, 2006

(30) Foreign Application Priority Data
Mar. 31, 2003   (EP) ..................................... 03100837

(51) Int. Cl.
*G06F 12/14*   (2006.01)
(52) U.S. Cl. ........................... 713/191; 726/27; 713/193

(58) Field of Classification Search .......... 713/191–193; 726/26–30; 705/65–67; 711/100
See application file for complete search history.

(56) References Cited

U.S. PATENT DOCUMENTS

| | | | |
|---|---|---|---|
| 5,502,765 A * | 3/1996 | Ishiguro et al. .................. 705/67 |
| 6,230,267 B1 * | 5/2001 | Richards et al. .............. 713/172 |
| 6,317,832 B1 | 11/2001 | Miller et al. |
| 6,411,200 B1 * | 6/2002 | Kawagishi .................. 340/10.51 |
| 6,748,532 B1 * | 6/2004 | Digiorgio et al. ............. 713/159 |
| 6,834,799 B2 * | 12/2004 | Tanabiki et al. .............. 235/382 |
| 6,899,277 B2 * | 5/2005 | Kawano et al. ............... 235/492 |
| 7,150,039 B2 * | 12/2006 | Kusakabe et al. .................. 726/9 |
| 7,232,073 B1 * | 6/2007 | de Jong ......................... 235/487 |
| 2002/0040438 A1 | 4/2002 | Fisher |
| 2002/0040936 A1 * | 4/2002 | Wentker et al. ............... 235/492 |
| 2002/0050528 A1 * | 5/2002 | Everett et al. ................ 235/492 |
| 2002/0129261 A1 * | 9/2002 | Cromer et al. ................ 713/193 |
| 2003/0105969 A1 * | 6/2003 | Matsui et al. ................. 713/194 |

FOREIGN PATENT DOCUMENTS

| EP | 0 935 214 | 8/1999 |
|---|---|---|
| EP | 1 004 992 | 5/2000 |

* cited by examiner

*Primary Examiner* — Nirav B Patel

(57) ABSTRACT

A Modification device (5) is designed to modify an application (A1, A2, A3, A4) run by a data carrier (S), wherein a first key information item (K1) is stored in the data carrier (S) and an associated second key information item (K2) is stored in the modification device.

17 Claims, 2 Drawing Sheets

METHOD TO GRANT MODIFICATION RIGHTS FOR A SMART CARD

The invention relates to a granting method to grant a modification device a modification right to modify an application in a data carrier.

The invention furthermore relates to a data carrier for running at least one application.

The invention furthermore relates to a modification device for modifying an application in the data carrier.

Such a data carrier is disclosed in the document EP 0 935 214 A, in which case the data carrier is formed by a smart card. Computer means of the data carrier are designed to run a number of applications or software programs. The known data carrier may for example run a banking application, running of which makes it possible for amounts of money to be loaded onto the data carrier at a cash machine and used to pay in a shop. Furthermore, the known data carrier could run a patient application, running of which makes it possible for patient data to be read and amended by doctors and medical insurance companies. A large number of other applications, such as credit card applications or car park ticket applications for example, are known to the person skilled in the art.

When, using a data carrier of this type which runs credit card applications, a payment is to be made at a credit card terminal, then, in order to verify the validity of the data carrier, a data carrier identification information item that identifies the data carrier is electronically transmitted by the credit card terminal to what is known as a trust center. The trust center checks the validity of the data carrier identification information item and, if the result of the check is positive, electronically outputs a validity information item to the credit card terminal.

In the known data carriers, the applications are installed or stored in storage means of the data carrier at the time of manufacture of the data carrier, or in any case before they are issued to users of the data carrier. If a number of applications have been installed on a data carrier, it must be ensured that the applications are run in a manner distinctly separate from one another and that undesired reciprocal accesses to data that is perhaps secret or security-related (e.g. amounts of money, patient data) are prevented. Appropriate precautions are disclosed in EP 0 935 214 A. Moreover, when modifying an application that is run or is to be run in a data carrier, it must also be ensured that other applications run by the data carrier are not adversely affected. Furthermore, it must be ensured that only persons or devices that are authorized to modify applications gain access to the storage means of the data carrier. In addition, the identity of the data carrier must be verified without doubt prior to installing the application, in order that the application is not stored on a different data carrier that is used by third parties.

It is an object of the invention to provide a granting method of the type mentioned in the first paragraph, a data carrier of the type mentioned in the second paragraph and a modification device of the type mentioned in the third paragraph, in which the above-described precautions have been taken. To achieve the above object, the following method steps are provided in such a granting method:

generation of a first key information item and of an associated second key information item for one or more data carriers identified by a data carrier identification information item;

granting of the modification right for data carriers identified by the data carrier identification information item by outputting of the data carrier identification information item and of the associated second key information item to the modification device;

checking of the association of the first key information item stored in the data carrier with the second key information item in the data carrier that was output to the data carrier by the modification device and, if the result of the check is positive;

allowing of the modification of the application in the data carrier by the modification device.

To achieve the above object, such a data carrier is characterized by the following features: computer means for running the at least one application, where information items communicated via the interfaces or information items stored in the data carrier are processed, and having storage means for storing a first key information item and an associated data carrier identification information item that identifies the data carrier, and having checking means for checking a modification right of a modification device to modify an application in the data carrier via the interface, where the checking means are designed to check the association of the first key information item stored in the storage means with the second key information item output to the data carrier by the modification device, and having modification means which, following confirmation of the modification right of the modification device by the checking means, are designed to enable modification of the application in the data carrier by the modification device.

To achieve the above object, such a modification device is characterized by the following features: at least one interface for the contactless and/or contact communication of information items to a data carrier identified by a data carrier identification information item, and having storage means for storing at least one data carrier identification information item that identifies a data carrier, and an associated second key information item, and having computer means for modifying applications in data carriers via the interface where, in the course of communication with a data carrier identified by a stored data carrier identification information item, the modification right of the modification device is output to the data carrier by communication of the second key information item associated with this data carrier identification information item, whereupon, following confirmation of the modification right by the data carrier, the modification device is authorized and designed to modify the application in the data carrier.

By means of the features according to the invention, the situation is achieved that, for data carriers which are identified by a data carrier identification information item, a respectively associated first and second key information item can be generated. The first key information item and the data carrier identification information item are stored in the data carrier and the second key information item and the data carrier identification information item are output to a modification device. As a result, the modification device obtains the modification right to modify one or more applications of the data carrier or carriers identified by the data carrier identification information item. Modification of an application of a data carrier in this case means the initial installation of the application on the data carrier, the updating (e.g. new version) of an application that is already installed on the data carrier, and also the deletion of an application from a data carrier.

The modification device may thus advantageously, at a time when the data carriers have already been issued to users, modify applications of the data carriers for which it has acquired the modification right by obtaining the data carrier identification information item and the associated second key information item. The acquiring of the modification right may be connected with the payment of a fee for the modification right, whereby an interesting business method is obtained. In this case, it is particularly advantageous that the modification of an application of a data carrier can take place in the course of communication of the data carrier with the modification device, without a trust center having to be contacted in order to confirm the modification right.

According to the measures of embodiments described herein, the advantage is obtained that the modification right can authorize the modification device, for example, only to install a new application, but not to update or delete the application. Likewise, the modification right could authorize the modification device only to delete an application and where appropriate also at the same time to install a new application in the storage area of the storage means in the data carrier which has become free as a result of the deletion. If a new version of an application is to be installed in place of the old version of the application on all data carriers that have already been issued to users, then a corresponding modification right could be issued by the operator of the application (e.g. barking application) to the operators of modification devices (e.g. cash machines). A large number of such advantageous uses are made possible, with it being possible for the acquiring of the modification right to be connected in each case with services in return, whereby an interesting business method is obtained.

According to the measures of embodiments described herein, the advantage is obtained that, by means of the modification right, that is to say by means of the data carrier identification information item and associated second key information item, the application which may be modified is identified. For a data carrier that runs two applications, it is therefore advantageously possible for the above-described different modification rights (install, update, delete) to be granted for each of the two applications.

According to the measures of embodiments described herein, the advantage is obtained that a modification right can be granted to install a new application in the data carrier, with the new application not requiring more than a maximum amount of storage space (e.g. 1 kBit) in the storage means. As a result, a particularly interesting business model is obtained in which storage space can be sold in data carriers that have already been issued to users. Thus, a credit card manufacturer could reserve, in the storage means of his credit card, storage space for future applications and, when a large number of credit cards have already been issued to users, sell this storage space in the form of corresponding modification rights to one or more companies in order to also run their applications (e.g. customer loyalty card, electronic car park ticket) using the credit card.

According to the measures of embodiments described herein, the advantage is obtained that, using only one modification right formed by only one data carrier identification information item and only one second key information item, an application can be modified in a group of data carriers, where the data carriers are all identified by the same data carrier identification information item.

According to the measures of embodiments described herein, the advantage is obtained that a modification right identifies specific access rights of the application that is to be modified. For example, a modification right could be granted for a credit card, which modification right authorizes the installation of an application that may use only the contact interface and not the contactless interface and exclusively permits reading rights in specific storage areas that are common to all applications of the credit card.

According to the measures of embodiments described herein, the advantage is obtained that the modification right can modify access rights for some or all of the applications run by the data carrier to interfaces or storage areas, by means of a second master key information item that is associated with the first master key information item stored in the data carrier. Likewise, using the master key information items, a new first key information item could be generated and stored in the data carrier and a new second key information item could be generated and stored in the modification device, in order to be able to modify another application.

According to the measures of embodiments described herein, the advantage is obtained that, using the master key information items, the modification of the access rights and/or the generation of key information items can be restricted to just one specific application.

According to the measures of embodiments described herein, the advantage is obtained that, in addition to the checking of the key information item by the data carrier, specific properties of the application that is to be modified are checked before modification of the application is enabled. In this case, for example, the operator of the application could store a third key information item in the application, the correctness of which is checked prior to modification of the application by the data carrier.

According to the measures of embodiments described herein, the advantage is obtained that what are known as Java applets can particularly advantageously be run by data carriers.

According to the measures of embodiments described herein, the advantage is obtained that the modification device can be formed by an operator computer of the operator of an application and by a reading device (e.g. cash machine), which are connected to one another over a data network (e.g. Internet, company network, telephone network, etc.). In this way, a large number of advantageous uses are made possible.

The invention will be further described with reference to examples of embodiments shown in the drawings to which, however, the invention is not restricted.

Figure 1:
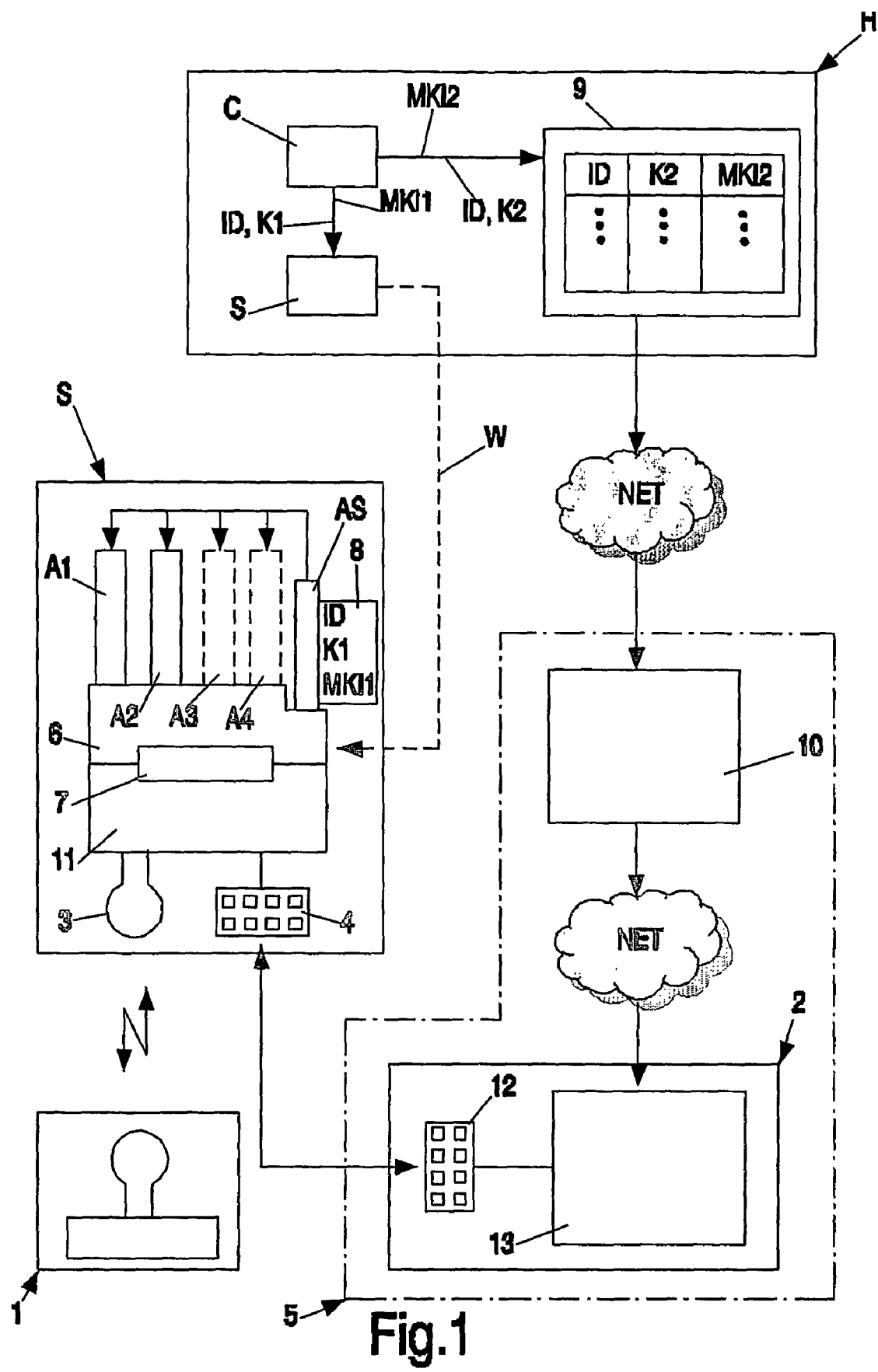
FIG. 1 shows a data carrier in which a modification device is installing another application.

FIG. 1 symbolically shows the manufacturing process H for a smart card S which forms a data carrier and which, after the manufacturing process H is complete, is designed for contactless communication with a terminal 1 and for contact communication with a reading device 2. During the manufacturing process H, an integrated circuit is incorporated into a plastic card and connected to an antenna 3, for contactless communication, and to a contact bank 4, for contact communication. Such a manufacturing process H has been known for a long time and is therefore not discussed in more detail here.

Figure 2:
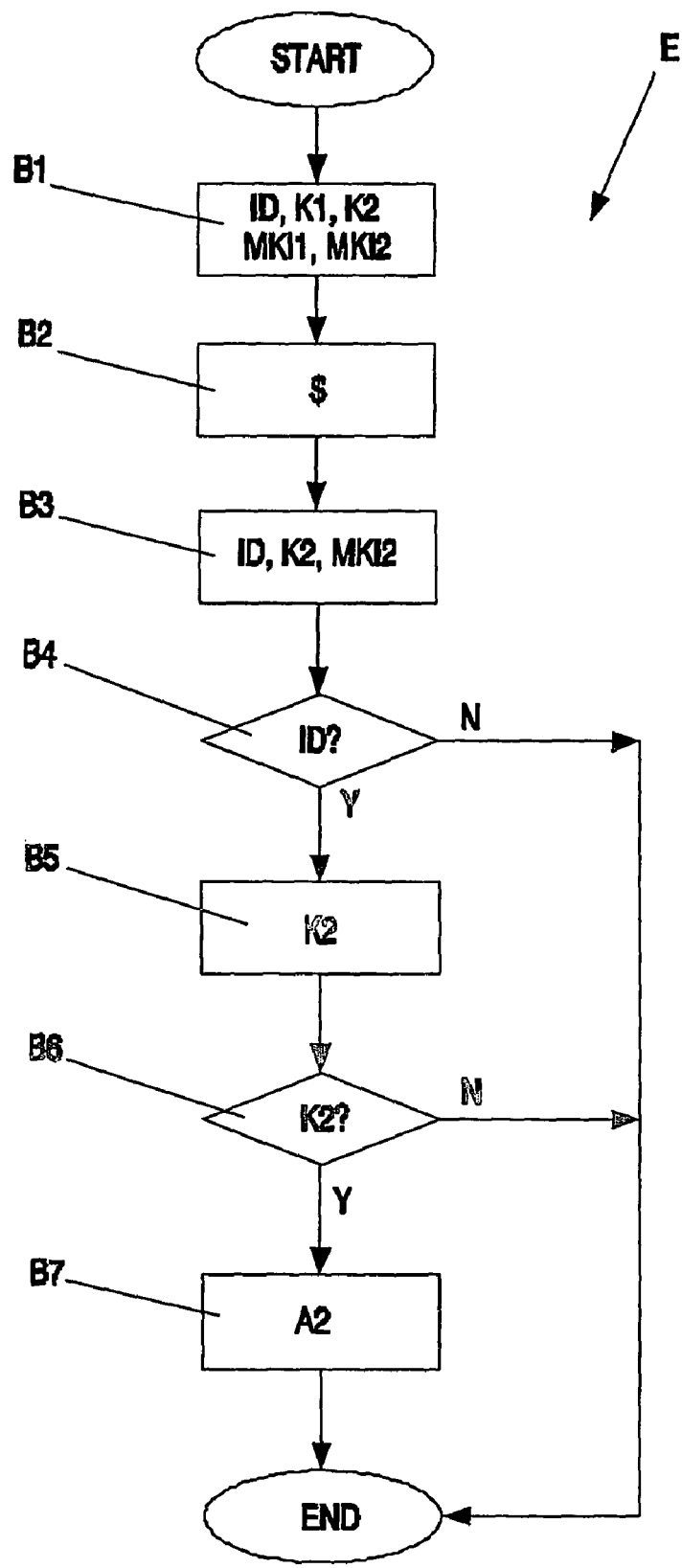
FIG. 2 shows a modification method for modifying an application in the data carrier shown in FIG. 1.

FIG. 2 shows a granting method E to grant a modification device 5 a modification right to modify an application in the smart card S. In this context, application is understood to mean the nature of the use (e.g. as credit card, as museum entrance ticket, etc.) of the smart card S and thus computer means 6 of the smart card S are understood to mean those which run a software program to make this use possible.

In the manufacturing process H for the smart card S, one or more applications, or the corresponding software programs, are stored in storage means 7 of the smart card S. Furthermore, during the manufacturing process H, each smart card S is given a data carrier identification information item, that is to say, according to this example of embodiment, a progressive serial number ID, which is stored in security storage means 8 of the smart card S and is used to unambiguously identify each smart card S. The serial number ID is in this case formed by a binary bit combination having 64 digits, and the security storage means 8 are formed by an area of the storage means 7 that is particularly well protected against hacker attacks.

According to block B1 of the granting method E, during the manufacturing process H a computer C generates a first key information item K1 and an associated second key information item K2 for each smart card S identified by its serial number ID. Furthermore, for some or all of the smart cards S identified by a serial number ID, a first master key information item MKI1 and a second master key information item MKI2 are generated, as described in greater detail below. The key information items K1 and K2 and also the master key information items MKI1 and MKI2 may in this case be formed by what are known as symmetric binary keys or by what are known as asymmetric binary keys, as has long been known to the person skilled in the art. The person skilled in the art also knows other encryption methods having in each case two key information items, which can likewise be used in this connection.

The first key information item K1 generated by the computer C, and the first master key information item MKI1 which may also have been generated, are stored in the security storage means 8 of the smart card S in a manner associated with the serial number ID of the smart card S and are processed by a security application AS run by the smart card S, as described in more detail below. Possibly all information items generated by the computer C, but in any case the serial number ID, the second key information item K2 and the second master key information item MKI2 which may also have been generated, are stored in security storage means 9 of the manufacturer of the smart card S. The information items stored in the security storage means 9 can then subsequently be used to grant modification rights to modify applications in the smart card S, as will be described in detail below with reference to examples of embodiments.

According to a first example of application, it is assumed that the manufacturer of the smart card S manufactures a million smart cards S for a credit card company. For this purpose, during the manufacture of the smart cards S, an item of credit card software is stored in the storage means 7 and run by the computer means 6 as first application A1. During manufacture, the serial number ID="123 . . . 84", the first key information item K1="2 . . . 4" and the first master key information item MKI1="88 . . . 3" are stored in the security storage means 8 of the smart card S. The serial number ID="123 . . . 84", the second key information item K2= "3 . . . 5" associated with the first key information item K1 and the second master key information item MKI2="99 . . . 4" associated with the first master key information item MKI1 are stored in an associated manner in the security storage means 9 of the manufacturer. An effective connection W indicates that all the smart cards S that are generated are issued to customers of the credit card company. Thereafter, the smart cards S are used to pay for transactions in shops, as is generally known.

When manufacturing the smart cards S, care was taken to ensure that the storage means 7 still have sufficient additional storage space even after the writing in of the credit card software. For example, the credit card software could occupy 3 kBits of the storage space of the storage means 7 and the security storage means 8 could occupy 4 kBits, with 17 kBits of the storage means 7 still remaining free, said storage means 7 being 24 kBits overall and being formed by an EEPROM. Furthermore, the computer means 6 have been dimensioned in terms of their computing power such that up to four applications A1, A2, A3 and A4 can be run in parallel or in a manner offset in terms of time.

According to the example of application, it is now assumed that a large department store chain would like to issue customer loyalty cards to its customers, in order to provide these customers with particular sales or refund conditions. Since a large number of customers of the department store chain pay for their purchases using the smart cards S of the credit card company and it is more convenient for the customer not to have to carry yet another card with him as the customer loyalty card, the department store chain acquires from the credit card company a modification right to install their customer loyalty card software on the smart cards S as a second application A2.

At a block B2 of the granting method E, the department store chain, as future operator of the application A2, asks the credit card company or the manufacturer of the smart cards S for a modification right and pays the purchase price necessary for this. In this case, the department store chain is essentially buying the storage space in the storage means 7 of all the smart cards S already issued to customers, in order to store the customer loyalty software in the storage means 7. The purchase price will in this case be dependent on the storage space requirement and on the number of smart cards S issued to customers. Furthermore, the purchase price can be made to be dependent on which interfaces—either only the contactless interface or only the contact interface or both interfaces—are required by the second application A2, and also on the computing power that will be necessary in order to run the second application A2. In addition, the purchase price will depend on whether master key information items have also been generated for the smart cards S and on whether the second master key information items MKI2 are being purchased at the same time. An interesting business model is thus obtained by the purchasing of modification rights.

Once the credit card company or the manufacturer of the smart cards S has reached agreement with the operator of the second application A2, that is to say the department store chain, at a block B3 the modification rights, that is to say the serial numbers ID together with the associated second key information items K2 for each smart card S and where appropriate also the second master key information items MKI2, are transmitted to an operator computer 10 of the operator of the second application A2. This transmission can—as shown in FIG. 1—take place over a data network NET, where the most stringent security precautions must be taken, for example by contacting a trust center, in order to prevent the modification rights being acquired by unauthorized persons. However, the modification rights could also be transmitted manually, by the handing over of a CD-ROM, hard disk or DVD that has the corresponding information stored on it to the operator of the application A2. The modification rights are then available in the operator computer 10.

According to the example of application, it is assumed that, for security reasons, only the contact interface of the smart cards S is to be used for the purpose of installing the second application. For this purpose, the modification device 5 for installing the second application is formed by the operator computer 10 and a large number of reading devices 2 connected to the operator computer 10 over a data network NET. As soon as a customer would like to pay for his goods using the credit card application of the smart card S and the salesperson inserts the smart card S into the reading device 2, the process of installing the second application on the smart card S begins at a block B4.

At the start of the installation process, the smart card S transmits its serial number ID via interface means 11, the contact bank 4 and a contact bank 12 of the reading device 2. A computer stage 13 of the reading device 2 transmits the serial number ID to the operator computer 10, which then checks whether the smart card S is a valid smart card S. Where necessary, the smart card S could encrypt a code word using its first key information item K1 and transmit it via the reading device 2 to the operator computer 10, which encrypted code word can be decrypted in the operator computer 10 only by means of the associated second key information item K2. This checking of the validity of the smart card S serves to prevent the second application A2 from being installed on an invalid smart card S.

Once the validity of the smart card S has been determined at the block B4, then the installation of the second application A2 is continued at a block B5 and otherwise terminated. At the block B5, the second key information item K2 associated with the serial number ID of the smart card S in the operator computer 10 is determined and output to the security application AS of the smart card S via the reading device 2. Where necessary, the second key information item K2 can also be encrypted for security reasons. The security application AS then checks, at a block B6, whether the first key information item K1 stored in the security storage means 8 is associated with the second key information item K2 output by the modification device 5, it being determined whether the modification device 5 has a modification right to modify or to install the second application A2.

If the result of the check at the block B6 shows that the modification device 5 is authorized to install the second application A2, then the second application A2 is stored in the storage means 7 of the smart card S at a block B7. To do this, the operator computer 10 transmits the second application A2 via the reading device 2 and the smart card S allows the reading device 2 access to the storage means 7 to a certain extent. The extent or nature of the modification of the second application A2 by the modification device 5 is in this case determined by the nature of the modification right, that is to say by the second key information item K2, and is ascertained by the security application AS in the smart cards S.

The modification right may authorize the operator of the second application A2 to install the second application A2 in apart of the storage means 7 that is limited in terms of its storage space (e.g. a maximum of 5 kBits). This ensures that there is actually enough storage space in the storage means 7 for four applications A1 to A4.

Furthermore, the access rights of the second application A2 to storage areas of the storage means 7 that are common for the applications and to the interfaces of the smart card S can be determined by the modification right. In this case, the customer loyalty card application could for example use only the contactless interface for the communication of customer data and refunds.

Furthermore, the modification right may determine which type of modification of an application can be carried out by the modification device 5. In this case, the modification device 5 could be authorized only to replace the second application A2 by a newer version of the customer loyalty card application or to replace it by a completely different second application A2. Likewise, the modification right could allow exclusively the deletion of the second application. Likewise, combinations of these possibilities or all these possibilities may be possible with only a second key information item K2.

Furthermore, the modification right may or must also identify the application which may be modified, in order to prevent, for example, a wrong application from being deleted from the storage means 7 of the smart card S. However, the modification right may also identify only a specific storage area in the storage means 7, in which storage area any modification or a prescribed modification may be carried out.

If the first master key information item MKI1 has been stored in the smart card S and if the associated second master key information item MKI2 for the smart card S has been output to the modification device 5, then the modification device 5 can modify access rights in the smart card S and/or generate further first key information items K1 in the smart card S and further second key information items K2 in the operator computer 10. It is assumed that the department store chain no longer wishes to use only terminals 1 that communicate contactlessly to communicate customer data, but rather would also like to use the reading devices 2 which communicate in a manner that requires contact. However, since the second application A2 at the time of its installation was only given access rights to the contactless interface (interface 11 and antenna 3), this is not possible. The modification device 5 can make contact, by encrypting an access right modification command using the second master key information item MKI2 and transmitting the encrypted code to the smart card S, to the effect that the security application AS ascertains the modification right of the modification device 5 by decrypting the received code using the first master key information item MKI1 stored in the security storage means 8, and executes the access right modification command. As a result, the second application A2 gains access both to the contactless interface and to the contact interface in the smart card S. It is thus advantageously possible, even in the case of applications which are run by smart cards S already issued to customers, for the access rights to interfaces and likewise to storage areas of the storage means 7 to be modified.

Furthermore, the case may arise where the first key information item K1 stored in the security storage means 8 has already been used to modify an application or has been discovered by hackers and thus can perhaps no longer be used. In this case, a new first and second key information item can be generated by the operator computer 10, where the new first key information item could be transmitted as code to the smart card S in a manner encrypted using the first master key information item MKI2. The security application AS of the smart card S could then decrypt the received code using the second master key information item MKI1, whereupon the new first key information item could advantageously be stored in the security storage means 8 of the smart card S to modify another application.

The first master key information item MKI1 and the second master key information item MKI2 could also be generated such that it is not possible to make modifications that relate to the smart card S as a whole but rather it is only possible to make access right modifications that relate to just one application or to generate new key information items for just this one application. It could hereby be ensured that certain critical applications (e.g. credit card application, banking application, etc.) can in no way be modified, that is to say not even by means of a master key information item, since the right of the master key information items would be restricted to other applications.

As a further security precaution, it could be defined that the modification of the application in the smart card S by the modification device 5 of the smart card S is only permitted when specific properties of the application that is to be modified are determined. For example, a further key information item which is perhaps not even known to the manufacturer of the smart card could have been inserted into the application by the operator of the application, the hidden further key information item of which forms a property of the application. The smart cards S would then permit a modification (e.g. deletion) of this application that is stored in the smart card S by the modification device 5 only when the modification device 5 transmits to the smart card S a key information item that is associated with the further key information item. The advantage is hereby obtained that the operator of the application can take further security precautions for its application.

According to a second example of embodiment which is not shown in the figures, the user of the smart card S could own a computer together with a connected contactlessly communicating terminal, which in this case forms a modification device. According to the second example of embodiment, the computer is connected via the Internet to a server of a message transmitter, by which messages can be called up and by which a message subscription is offered. The user electronically fills out a registration form for the message subscription and enters his credit card number to pay for the message subscription (block B2). Then, a modification right (ID and K1) is stored via the Internet on the user's computer, by means of which modification right a message application can be installed in the smart card. According to the installation process described above, the message application is then stored in the smart card as third application. The user then has the possibility; using the smart card, to call up current messages of the message subscription at any computers with contactlessly communicating terminals. Furthermore, a cinema ticket for a visit to the cinema was also included in the message subscription. The user can thus present his smart card at a terminal of a cinema ticket point, whereupon the message application of the smart card confirms a cinema ticket only once, in the course of contactless communication. This service is possible since the operator of the cinema is collaborating with the operator of the message transmitter.

A transponder, a Personal Digital Assistant, a mobile telephone or another similar device could also be used as data carrier. The contactless communication can take place, for example, in accordance with one of the published standards ISO14.443, ISO15.693, ISO18.000, ECMA 340 or else in accordance with one of the telephone standards GSM or UMTS.

By means of the granting method according to the invention, the data carrier according to the invention and the modification device according to the invention, in addition to the advantages described above, the essential advantage is obtained that applications can be modified in data carriers that have already been issued to customers, and thus additional services can be enabled with the data carriers, without having to involve a trust center for this purpose. By avoiding the need for a trust center, applications can also be modified by modification devices operating "off-line" and costs for the trust center can be saved. An interesting business method is obtained by the selling of the modification rights.

The invention claimed is:

1. A granting method to grant a modification device a modification right to modify an application in a data carrier, the method comprising:

generation of a first key information item and of an associated second key information item for a data carrier identified by a data carrier identification information item;

generation of a first master key information item and an associated second master key information item in addition to the first key information item and the associated second key information item;

checking of the association of the first key information item stored in the data carrier with the second key information item from the modification device;

allowing of the modification of the application in the data carrier by the modification device in response to a determination that the first key information item is associated with the second key information item;

checking of the association between the first master key information item stored in the data carrier with the second master key information item from the modification device; and allowing a modification by the modification device of access rights to at least one interface of the data carrier in response to a determination that the first master key information item is associated with the second master key information item, wherein the at least one interface of the data carrier is for contactless and/or contact communication of information items.

2. A granting method as claimed in claim 1, wherein the modification right gives the right to install and/or update and/or delete the application in the data carrier.

3. A granting method as claimed in claim 1, wherein the modification right only gives the right to modify a specific application in the data carriers.

4. A granting method as claimed in claim 1, wherein the modification right only gives the right to install an application requiring a predefined maximum amount of storage space in the data carrier.

5. A granting method as claimed in claim 1, wherein the data carrier identification information item identifies a group of data carriers.

6. A granting method as claimed in claim 1, wherein the modification right also determines the access rights of the application that is to be modified in the data carrier to storage areas and interfaces of the data carriers.

7. A granting method as claimed in claim 1, wherein the modification of access rights in the data carrier and/or the generation of further key information items in the data carrier and the modification device is possible only with the first master key information item stored in the data carrier and only with the second master key information item stored in the modification device.

8. A granting method as claimed in claim 7, wherein the first master key information item and the associated second master key information item only make it possible to modify access rights of a specific application in the data carrier and/or to generate further key information items in the data carrier and the modification device in order to modify a specific application.

9. A granting method as claimed in claim 1, wherein modification of the application in the data carrier by the modification device of the data carrier is only permitted when specific properties of the application that is to be modified are determined.

10. A data carrier for running at least one application, the data carrier comprising:

at least one interface for contactless and/or contact communication of information items, a computer processing device for running the at least one application, where information items communicated via the interfaces or information items stored in the data carrier are processed, a storage device for storing a first key information item, a first master key information item separate from the first key information item, and an associated data carrier identification information item that identifies the data carrier, wherein the computer processing device is further configured to check a modification right of a modification device to modify an application in the data carrier via the at least one interface, and to check the association of the first key information item stored in the storage device with a second key information item output to the data carrier by the modification device, and wherein, following confirmation of the modification right of the modification device, the computer processing device is further configured to enable modification of the application in the data carrier by the modification device;

wherein the computer processing device is further configured to check an association of the first master key information item stored in the storage device with a second master key information item from the modification device;

wherein the computer processing device is further configured, upon confirmation of the association of the first master key information item with the second master key information item, to enable modification of access rights to the at least one interface for the contactless and/or contact communication.

11. A data carrier as claimed in claim 10, wherein the computer processing device is further configured to confirm a restricted modification right which only gives the right to install and/or update and/or delete the application, in the data carriers.

12. A data carrier as claimed in claim 10, wherein the computer processing device is further configured to confirm a restricted modification right which only gives the right to modify a specific application in the data carrier.

13. A data carrier as claimed in claim 10, wherein the computer processing device is further configured to confirm a restricted modification right which only gives the right to install an application requiring a predefined maximum amount of storage space in the data carrier.

14. A data carrier as claimed in claim 10, wherein the computer processing device is further configured to confirm a modification right which determines the access rights of the application that is to be modified in the data carrier to storage areas of the storage device and interfaces of the data carrier.

15. A data carrier as claimed in claim 10, wherein the computer processing device is further configured to run an application formed by an applet.

16. A modification device for modifying an application in a data carrier, the modification device comprising:
   at least one interface for contactless and/or contact communication of information items to a data carrier identified by a data carrier identification information item,
   a storage device for storing at least one data carrier identification information item that identifies a data carrier, an associated second key information item, and a second master key information item, and
   a computer processing device for modifying applications in data carriers via the interface where, in the course of communication with a data carrier identified by a stored data carrier identification information item, the modification right of the modification device is output to the data carrier by communication of the second key information item associated with this data carrier identification information item, whereupon, following confirmation of the modification right by the data carrier, the modification device is authorized and designed to modify the application in the data carrier, wherein the computer processing device is further configured to modify access rights to the at least one interface of the data carrier in response to a determination that the second master key information item is associated with a first master key information item stored on the data carrier.

17. A modification device as claimed in claim 16, wherein the modification device is formed by an operator computer containing the storage device and by a reading device that is connected to the operator computer over a data network, the reading device comprising the at least one interface and at least part of the computer processing device of the modification devices.

\* \* \* \* \*